July 17, 1956   J. SNYDER   2,755,414
PULSE STRETCHING AND INDICATING SYSTEM
Filed July 18, 1952

INVENTOR.
JAMES SNYDER
BY
Harry M. Saragovitz
Attorney

2,755,414

PULSE STRETCHING AND INDICATING SYSTEM

James Snyder, Asbury Park, N. J., assignor to the United States of America as represented by the Secretary of the Army Application July 18, 1952, Serial No. 299,775

8 Claims. (Cl. 315—22)

(Granted under Title 35, U. S. Code (1952), sec. 266)

The invention described herein may be manufactured and used by or for the Government for governmental purposes, without the payment to me of any royalty thereon.

This invention relates to a pulse stretching and indicating circuit.

It is often necessary to detect the initial pulse of a voltage wave train and visually represent the polarity and amplitude of such pulse on an indicator. If the pulse is of short duration, it is difficult to present it on indicating devices such as a cathode ray tube. This invention obviates such difficulties by effectively lengthening the pulse to be observed.

It is therefore an object of this invention to detect the initial pulse of a voltage wave.

It is another object of this invention to detect and stretch a voltage pulse that occurs at a random time.

It is still another object of this invention to provide a circuit for effectively stretching a voltage pulse to a predetermined length.

It is a further object of this invention to display a voltage pulse on a cathode ray tube with increased brightness.

These and further objects of the invention will be more apparent when the specification is read in connection with the drawing, in which.

In general, the invention comprises a condenser that is charged through a gating circuit by the initial pulse of a voltage wave. At a predetermined amplitude of such pulse, the gating circuit is blocked so that the condenser will hold its charge at this amplitude. This condenser is connected to a high impedance output circuit, through which there is negligible discharge, so that a long pulse is obtained. The output circuit may take the form of a vacuum tube amplifier coupled to a cathode ray tube deflection circuit or the condenser may be directly connected to the cathode ray tube deflection circuit. After a predetermined period, the gating circuit is unblocked and the condenser discharges through such circuit and a resistor.

Figure 1:
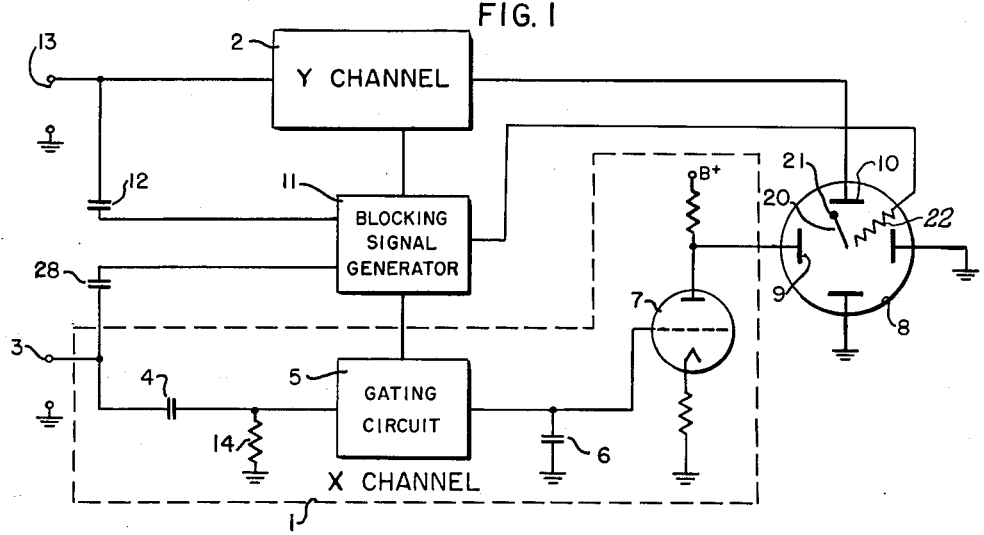
Fig. 1 is a schematic diagram in block form of the invention.

Turning now to a more specific description of the invention, two similar channels 1 and 2 designated X and Y are shown in Fig. 1. Describing the X channel in detail, an input terminal 3 is connected through a blocking condenser 4 and a gating circuit 5 of conventional design to a condenser 6. For example, the gating circuit may take the form shown in Fig. 3 and will be described more fully below. A resistor 14 is in circuit with a device for storing an electric charge, preferably a condenser 6, through gating circuit 5. Also connected to condenser 6 is the grid of a tube 7, such tube being illustrated as a conventional triode amplifier. It is obvious that any circuits having a high input impedance could be utilized in the output circuit of the invention including a cathode ray tube deflection system. Connected to the plate of tube 7 is a deflection plate 9 of a cathode ray tube 8, this tube also having another deflection plate 10 connected to Y channel 2. It is obvious that any type of amplifier such as a push pull arrangement could be substituted for the single ended amplifier.

A blocking signal generator 11 is connected to terminal 3 through a blocking condenser 28. Also coupled to generator 11 through a blocking condenser 12 is an input terminal 13. The signal generator 11 may comprise a monostable multivibrator, often referred to as a one-shot multivibrator. However, this circuit is not limited to a multivibrator, but may include any triggered circuit that produces pulses of a predetermined length. The output of generator 11 is applied to gating circuit 5 and may also be applied to a similar gating circuit in channel Y of the deflection circuit of cathode ray tube 8. A control grid 22 of cathode ray tube 8 may be coupled to generator 11.

Figure 3:
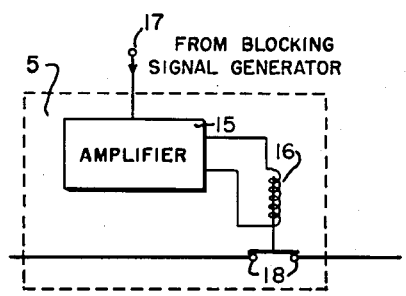
Fig. 3 is one embodiment of a gating circuit for use in the invention.

The gating circuit in Fig. 3 comprises an amplifier 15 feeding a fast acting relay 16. A gating pulse applied to an input terminal 17 causes the energization of the relay thereby opening contacts 18. It is to be noted that the gating circuit 5 may also comprise electronic means, an electro-mechanical device being shown in this instance for clarity.

Figure 2:
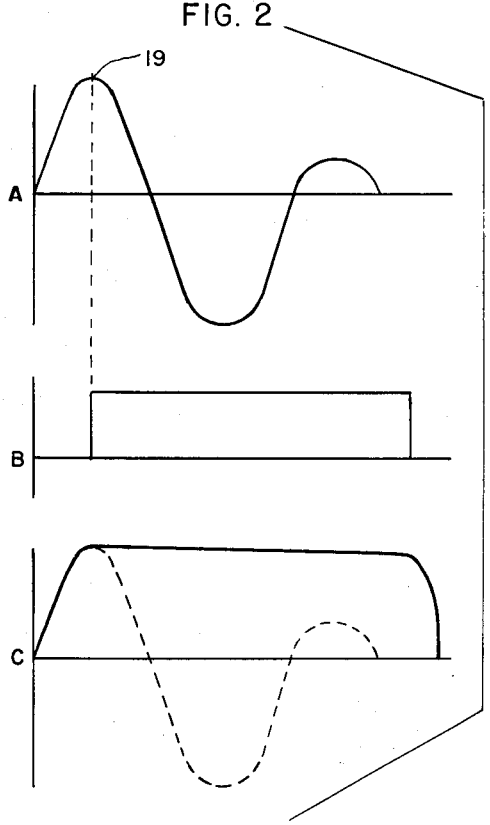
Fig. 2 illustrates waveforms of voltages found in Fig. 1.

The operation of the invention will be explained with reference to the waveforms illustrated in Fig. 2. Signal A, applied to terminal 3, charges condenser 6 through gating circuit 5 and condenser 4. When signal A reaches either its peak or a predetermined amplitude 19, blocking signal generator 11 will fire, thereby generating a pulse shown by curve B which will open gating circuit 5. While this circuit is open, condenser 6 will hold substantially all of the charge applied thereto, and the output signal from tube 7 will take the form of the wave shown in curve C of Fig. 2. The blocking pulse B from generator 11 is of a predetermined interval which is preferably longer than signal A applied to terminal 3. This is clearly illustrated by Fig. 2. At the end of pulse B, gating circuit 5 will close due to the de-energization of relay 16. This allows condenser 6 to discharge through gating circuit 5 and resistor 14.

When simultaneous signals having amplitudes bearing a predetermined ratio relative to each other after a prescribed time interval are applied to terminals 3 and 13, the first signal to attain the aforementioned predetermined amplitude will trigger generator 11 which furnishes blocking pulses to both the X and Y channels.

After the gating circuits in both channels are opened by the output of blocking signal generator 11, the ratio between both applied signals at the instant of gating is maintained by the storage devices in each channel. Thus spot 21 is maintained in a fixed position thereby increasing the intensity of the phosphorescence of cathode ray tube 8 at spot 21. It is well known that, until blocking signal generator 11 is triggered, the trace on cathode ray tube 8 will be a line which is the resultant of the two signals applied to terminals 3 and 13. Since the output voltages of channels X and Y remain substantially constant for a relatively long time, the bright spot 21 will be clearly visible to an observer and easily photographed, if desired. The position of line 20 and spot 21 will be determined by the amplitude of the signals applied to input terminals 3 and 13, the cathode ray tube 8 effectively resolving such signals.

The quiescent position of spot 21 is normally at the center of cathode ray tube 8 and may be operated at a very low brilliance level. For this type of operation, when spot 21 is deflected outwardly to the indicating position as shown in Fig. 1, it is intensified by applying a portion of the output of signal generator 11 to the intensity grid 22 of the cathode ray tube 8. It is obvious that other elements equivalent to the control grid 22 may be utilized to intensify spot 21. By this arrangement, the indicating position of spot 21 may be more readily ascertained by means of a linex or any other suitable indexing device.

Although a preferred embodiment of this invention has been described, other modifications may be made that will fall within the spirit and intent of this invention.

I claim:

1. A condenser charging and discharging system comprising a single conductive path in both the charging circuit and the discharging circuit, a gating circuit and a resistor included in said path, a blocking generator responsive to charging voltages for controlling said gating circuit so that said condenser is charged through said gating circuit, remains charged for a predetermined interval and discharges through said gating circuit and said resistance.

2. A pulse stretching circuit comprising a single conductive path to charge and discharge a storage device including a gating circuit, an output circuit associated with said storage device, means responsive to charging pulses for controlling the conductivity of said gating circuit so that said pulses will appear at said output circuit for an interval determined by the non-conductivity of said gating circuit.

3. A system as in claim 2 wherein said storage device is a condenser.

4. An indicating system comprising a cathode ray tube having a control element and deflection means, a condenser, a single conductive path for charging and discharging said condenser including a gating circuit, a blocking signal generator responsive to charging signals of a predetermined magnitude for controlling said gating circuit, said control element responsive to the output of said signal generator for intensifying said cathode ray tube indications, means for coupling said condenser to said cathode ray tube deflection means.

5. A cathode ray tube deflection system comprising two channels; each of said channels including a condenser, a single conductive path for charging and discharging said condenser including a gating circuit, means for coupling said condenser to the cathode ray tube deflection means; a blocking signal generator for controlling said gating circuits.

6. A system as defined in claim 5 wherein said coupling means is a high impedance amplifying circuit.

7. A cathode ray tube deflection system comprising two channels; each of said channels including a condenser, a single conductive path for charging and discharging said condenser including a gating circuit, means for coupling said condenser to the cathode ray tube deflecting means; a blocking signal generator responsive to charging signals of a predetermined magnitude for controlling said gating circuits.

8. An indicating system comprising a cathode ray tube having a control element and deflection means, two channels; each of said channels including a condenser, a single conductive path for charging and discharging said condenser including a gating circuit, means for coupling said condenser to said deflection means; a blocking signal generator responsive to charging signals of a predetermined magnitude for controlling said gating circuits, and said control element responsive to the output of said signal generator for intensifying said cathode ray tube indications.

References Cited in the file of this patent

UNITED STATES PATENTS

| Number | Name | Date |
| --- | --- | --- |
| 2,329,137 | Richards | Sept. 7, 1943 |
| 2,406,858 | Shepherd et al. | Sept. 3, 1946 |
| 2,411,071 | Wade | Nov. 12, 1946 |
| 2,419,340 | Easton | Apr. 22, 1947 |
| 2,428,926 | Bliss | Oct. 14, 1947 |
| 2,431,766 | Miller | Dec. 2, 1947 |
| 2,464,393 | Heim | Mar. 15, 1949 |
| 2,510,160 | Williams | June 6, 1950 |
| 2,519,413 | Taylor | Aug. 22, 1950 |
| 2,552,022 | Watson | May 8, 1951 |
| 2,552,884 | Cannon | May 15, 1951 |
| 2,595,228 | Crist | May 6, 1952 |